United States Patent [19]

Cloutier et al.

[11] Patent Number: 4,659,200

[45] Date of Patent: Apr. 21, 1987

[54] MOTOR-DRIVEN CAMERA MECHANISM

[75] Inventors: Robert P. Cloutier, Spencerport; Richard A. Gates, Hilton; Dana W. Wolcott, Honeoye, all of N.Y.

[73] Assignee: Eastman Kodak Company, Rochester, N.Y.

[21] Appl. No.: 748,533

[22] Filed: Jun. 24, 1985

[51] Int. Cl.⁴ .......................... G03B 1/00; G03B 17/42
[52] U.S. Cl. ................................ 354/121; 354/173.1; 354/203; 354/204
[58] Field of Search ...................... 354/121, 173.1, 251, 354/266, 212, 203, 204

[56] References Cited

U.S. PATENT DOCUMENTS

| | | | |
|---|---|---|---|
| 2,625,087 | 1/1953 | Steineck | 354/121 |
| 4,202,614 | 5/1980 | Harvey | 354/121 |
| 4,309,096 | 1/1982 | Sethi | 354/121 |
| 4,361,387 | 11/1982 | Cloutier | 354/121 |
| 4,382,668 | 5/1983 | Umehara et al. | 354/121 |
| 4,449,806 | 5/1984 | Wong et al. | 354/173.1 |
| 4,492,443 | 1/1985 | Spencer | 354/266 |
| 4,561,743 | 12/1985 | Benson | 354/121 |
| 4,602,859 | 7/1986 | Chan | 354/121 |

OTHER PUBLICATIONS

Research Disclosure, Mar. 1982, Industrial Opportunities Ltd., Havent, England, pp. 97-98, 100-101.

Primary Examiner—A. A. Mathews
Attorney, Agent, or Firm—Robert L. Randall

[57] ABSTRACT

A motorized disk film camera which is of simple, compact and inexpensive construction and yet provides one-button operation to expose the film and actuate a motor which disengages the film and cocks the shutter, then advances the locates the film. The camera requires no separate operation to initialize a cartridge when it is loaded into the camera. The shutter actuation does not require a long button stroke and the motor drive and control is simple and inexpensive.

17 Claims, 17 Drawing Figures

MOTOR-DRIVEN CAMERA MECHANISM

BACKGROUND OF THE INVENTION

1. Field of the Invention

The present invention relates to a simple, inexpensive camera in which a manual shutter actuating button serves to locate the film for exposure and release the shutter, then to actuate a motor to disengage and advance the film and recock the shutter.

2. Description of the Prior Art

Cameras for use with a film disk are currently marketed by Eastman Kodak Company and others incorporating a motor drive which is energized by the operator to locate, expose and advance the film. This camera/film combination provides the consumer with unprecedented convenience in that the operation is totally automated and the physical size permits ready pocketability. one example of the structure of such a camera is found in U.S. Pat. No. 4,361,387 issued inthe name of R. Cloutier.

Other cameras have been devised for use with disk film which are simpler in construction and operation, utilizing manual operations for film location, exposure and advance. One such camera is described in U.S. Pat. No. 4,492,443 which illustrates a manually operated camera that provides substantially the same operational features of the Cloutier camera, but without the expense of a motor and its controls. This camera provides the convenience of one-button operation to first actuate the shutter and then to advance the film.

Other examples of prior art cameras used with film disks include U.S. Pat. No. 4,202,614 which illustrates another manually operated camera and U.S. Pat. No. 2,625,087 which discloses a camera that utilizes a reloadable film cartridge assembly with film in the form of a disk. This last camera permits one-button operation, actuating the shutter for film expsoure and then advancing the film for the next expsoure. However, this camera does not provide a mechanism for the accurate location of the film during exposure and for subsequent release to permit advancing the film for the next exposure. Thus, this camera does not provide sufficiently accurate film positioning to ensure high resolution photographs under all conditions.

Still other examples of prior art cameras for use with film disks are disclosed at pages 97-98 and 100-101 of the March 1982 issue of Research Disclosure published by Industrial Opportunities Ltd., Havant, England. These cameras are reasonably simple and compact, providing manual and one-button operation. Nevertheless, each of these cameras suffers from structural limitations that detract from the operating convenience for the customer.

While the camera disclosed in U.S. Pat. No. 4,492,443 is simple and inexpensive in its construction, and provides ease of opeation, it has the potential disadvantage of requiring a long actuation stroke to mechanically perform all of the camera functions necessary. It has been found that such long camera actuating motions can contribute to camera movement resulting in unsharp photographs.

While it is known to utilize small electric motors to perform some or all of the camera functions, permitting a short, light actuating motion by the user, such as to actaute an electric switch to actuate the motor, motorized camera exemplified by the above Cloutier patent have utilized complex and expensive electronic sensors and controls.

SUMMARY OF THE INVENTION

Accordingly, the present invention provides a disk film camera which is of simple, compact and inexpensive construction and yet which provides one-button motorized operation to locate the film, advance the next film frame and reset the shutter. This arrangement permits the use of a very short stroke shutter actuating button and motorized film advance and recocking of the shutter without the necessity of complex and expensive motor controls.

According to one aspect of the present invention, a disk camera is provided having a cockable and releasable shutter means, a film advancing means, and film locating means movable between a film engaging position and a film releasing position. A driver member is arranged for movement in opposite first and second directions and is arranged, when moved in the first direction, to cock the shutter means. The driver member, when moved in the second direction, moves the film locating means to a film releasing position and then actuates the film advancing means and moves the film locating means back to the film engaging position. A motor means is operable to move the driver member in the first and second directions.

Further, the present invention provides a disk camera having a cockable and releasable shutter means, a film advancing means, and film locating means movable between a film engaging position and a film releasing position. A driver member is arranged for movement in opposite first and second directions after actuation of the shutter means, with the driver member arranged, when moved in the first direction, to cock the shutter means and, when moved in the second direction, to move the film locating means to a film releasing position and then to actuate the film advancing means. Thereafter, the film locating means is moved into the film engaging position. A motor means is operable to move the driver member in the first and second directions through a cam and a cam-driven lever which engages the drive member. A compliant member is arranged to resiliently urge the driver member into contact with the lever whereby the lever means moves the driver member in the first direction and the compliant member moves the driver member in the second direction.

Various means for practicing the invention and other features and advantages thereof will be apparent from the following detailed description of illustrative preferred embodiments of the invention, reference being made to the accompanying drawings.

IN THE DRAWINGS

Figure 8:
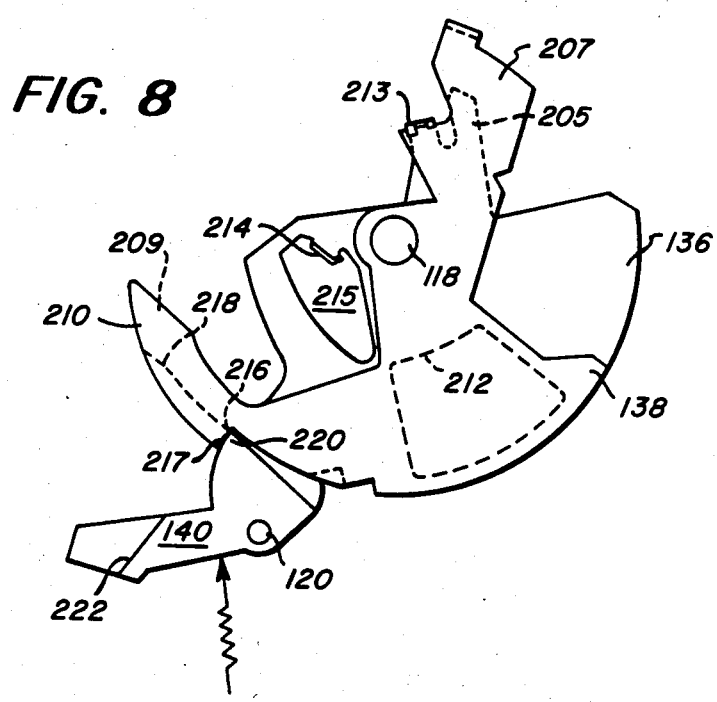
Figure 7A:
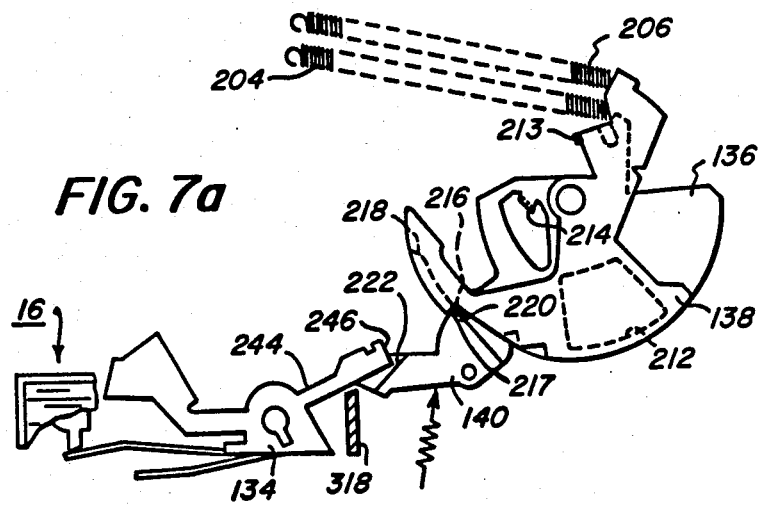
Figure 7B:
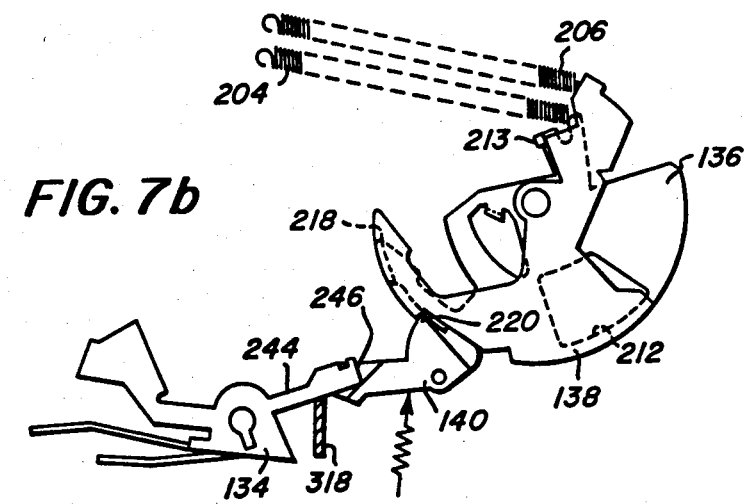
Figure 7C:
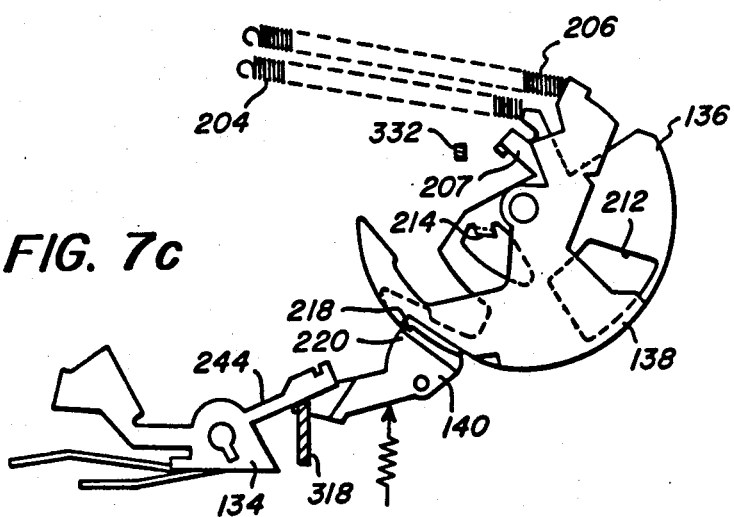
Figure 9:
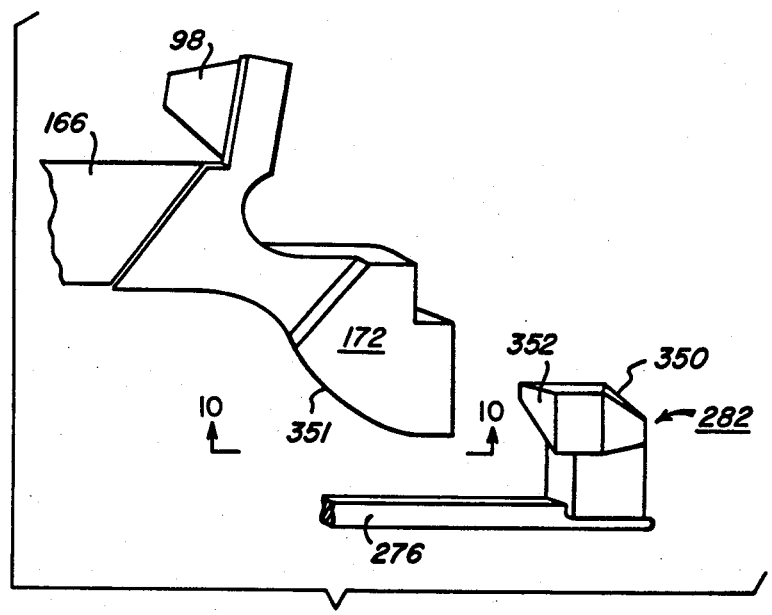
Figure 10:
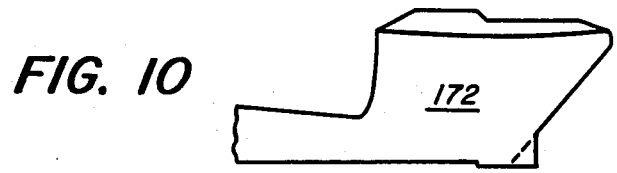
Figure 11:
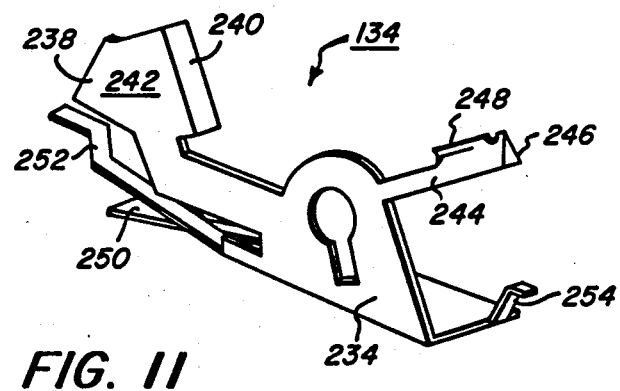
Figure 12:
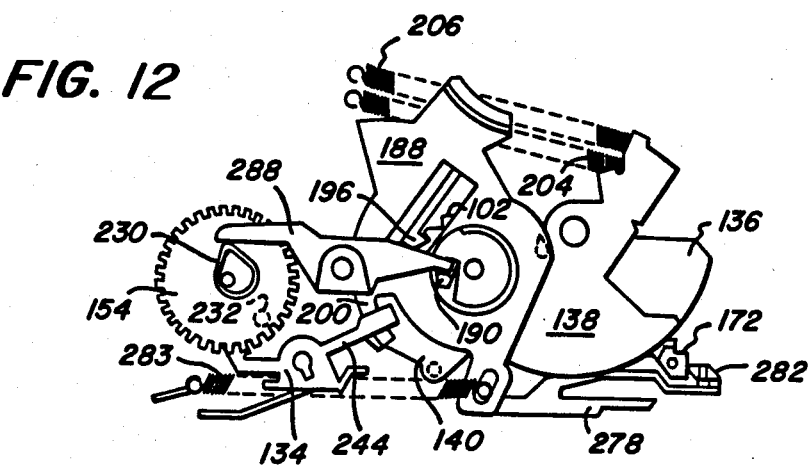
Figure 13:
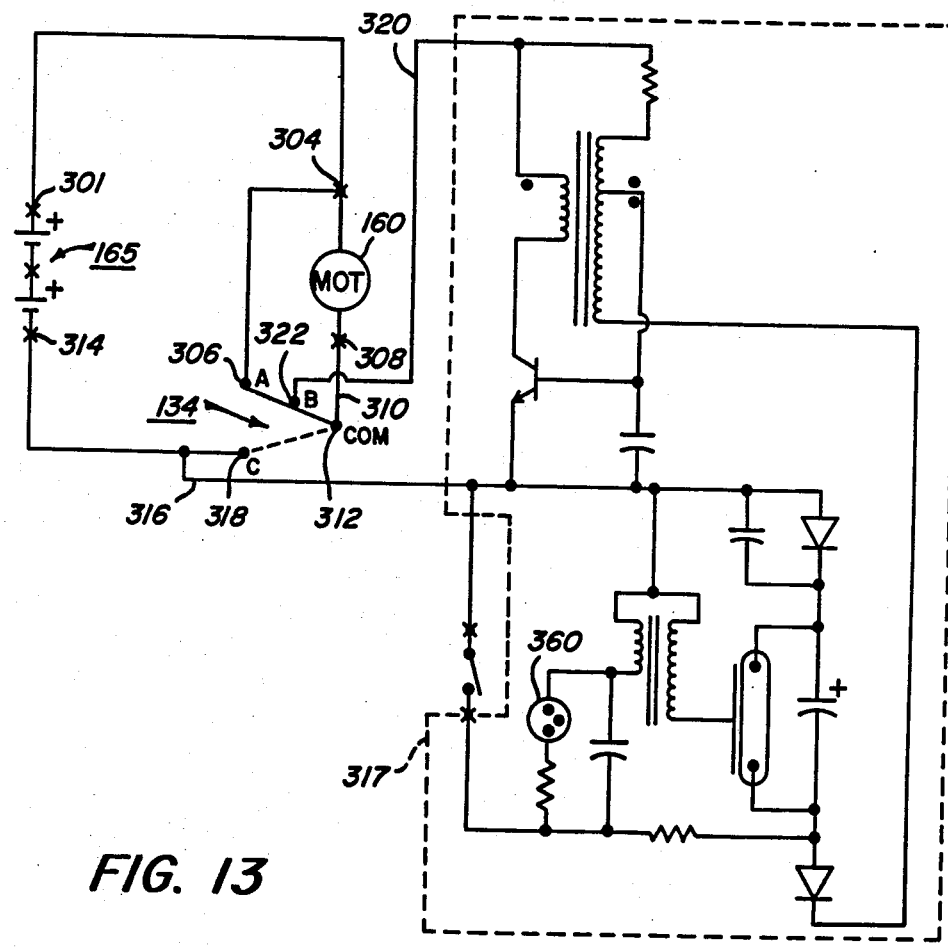
Figure 14:
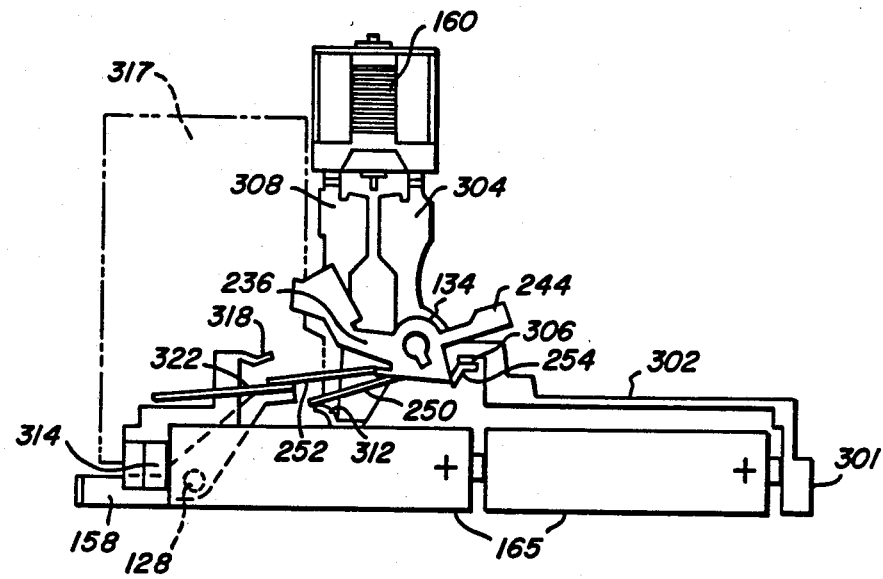
Figure 15:
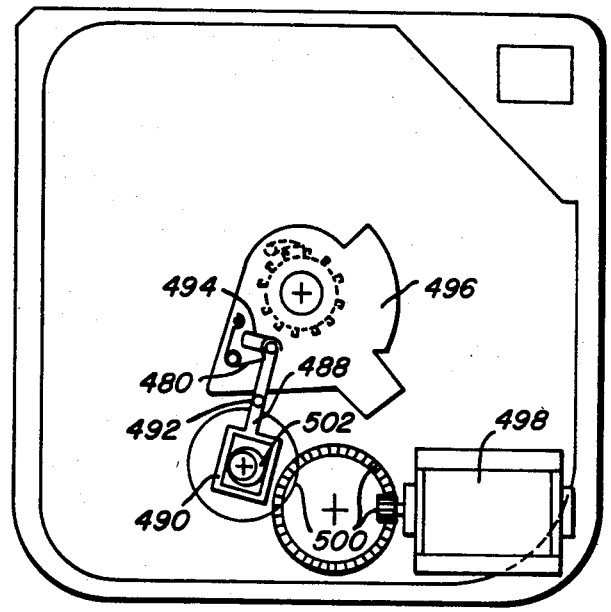

FIG. 7a–c is a sequential view of the shutter blades and the shutter latch;

FIG. 8 is a detail of the shutter blades and shutter latch;

FIG. 9 is a detail of the demetering cam and the lifting cam;

FIG. 10 is a view taken along line 10—10 of FIG. 9;

FIG. 11 is a detail view of the release lever;

FIG. 12 is a view of the camera components at the time in the operation cycle when the drive link is at the apex of the cam lobe;

FIG. 13 is a schematic of the electric circuitry of the camera;

FIG. 14 is an illustration of the motor, switching and circuit components;

FIG. 15 is an alternative embodiment of the present invention.

DESCRIPTION OF THE ILLUSTRATIVE PREFERRED EMBODIMENT

Although the present invention is applicable to various kinds of cameras, the illustrative embodiments are directed to cameras adapted to use disk film cartridges of the type disclosed in U.S. Pat. No. 4,309,096, entitled Film Cartridge Assembly with Pressure Plate which issued in the name of G. S. Sethi.

GENERAL DESCRIPTION OF CARTRIDGE AND CAMERA

Figure 1:
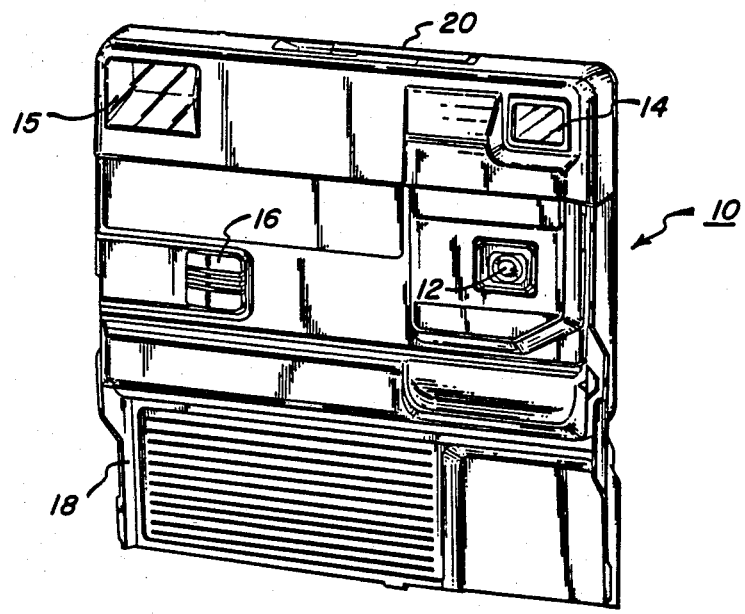
FIG. 1 is a front perspective view of a camera incorporating the invention depicting the camera in its normal operating position.
Figure 2:
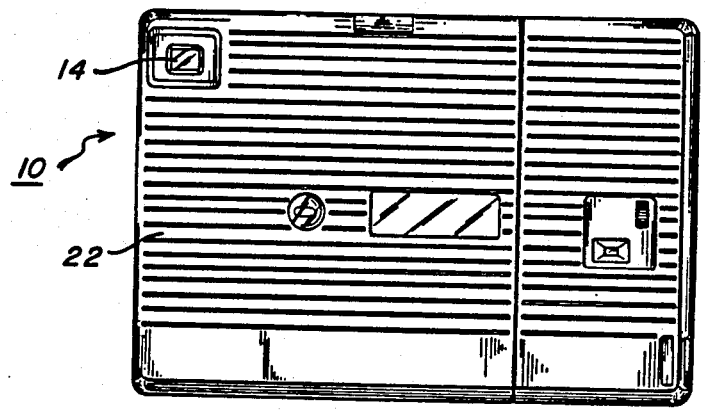
FIG. 2 is a rear view of the camera shown in FIG. 1.

Referring now to the drawings and in particular to FIGS. 1 and 2, there is shown front and rear perspective views of a camera 10 incorporating the present invention. The camera comprises a body in the form of a relatively thin, generally rectangular box. The camera front, shown in FIG. 1, includes a picture-taking lens 12, a viewfinder 14, a flash 15, and a shutter release button 16. Additionally, the camera can be provided with a movable cover-handle 18, as is well known in the art. A door release lever 20, disposed in the top edge of the camera, is operable to unlatch a rear door 22 of the camera so that it may be opened for loading a film cartridge assembly into a receiving chamber, as will be more fully described hereinbelow.

Figure 3:
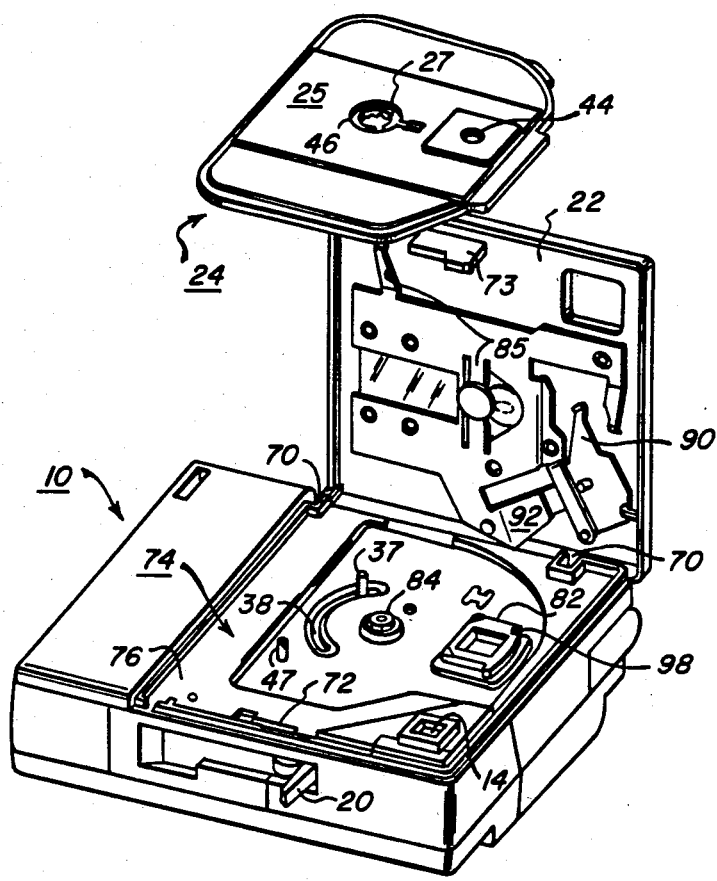
FIG. 3 is a rear perspective view of the camera shown in FIG. 1; depicting the camera in a horizontal, "face-down" position with the loading door in an open position and showing a film cartridge in position for loading into the camera.
Figure 4:
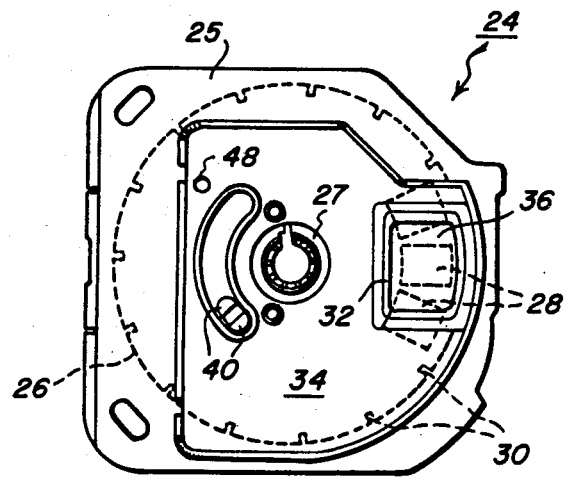
FIG. 4 is a front view of the film cartridge shown in FIG. 3.

A film cartridge 24 is shown in FIGS. 3 and 4 and, according to the teachings of the foregoing Sethi patent, comprises a generally flat light-tight plastic housing 25 enclosing a rotatable disk of film 26 provided with a central hub 27 that is accessible from the exterior of the housing. The film disk is provided with a plurality of uniformly spaced exposure regions 28 defined by previously exposing the surrounding portion of the film. Each of the exposure regions is associated with a corresponding adjacent metering notch 30, located along the edge of the film disk in a clockwise direction from the respective exposure region, as viewed in FIG. 4. An exposure window 32 in the front wall 34 of the cartridge housing 25 is provided with a cover slide 36 that is pivotably movable into and out of alignment with the exposure window by means of a slide operating pin 37 (FIG. 3) that extends through an arcuate slot 38 in the camera wall and is received between two studs 40 on the cover slide. The rear wall of the cartridge housing 25 includes a pressure plate member 44 in alignment with the exposure window 32 in the front wall. An exposure counter dial 46 on the corresponding face of the film disk hub 27 is also visible through the rear wall.

When the cartridge is loaded into the receiving chamber of the camera, a pin 47 in the camera enters light-tight opening 48 in the front cartridge wall and releases a locking device, not shown, that initially locks the cover slide 36 in alignment with window 32. Initially, as viewed in FIG. 3, the film disk is located in its extreme clockwise position, defined by the engagement of a hub ear with the lower edge of a cartridge ear. From this position in the film disk initially must be rotated in a counterclockwise direction through an angle equal to approximately ⅓ the angle between adjacent image areas to bring the first available image area into exposure position. Similarly, when the film disk has rotated through somewhat less than 360 degrees to its extreme counterclockwise position, after exposure of all of the image areas, the engagement of the hub ear with the upper edge of the cartridge ear locates the last exposure area counterclockwise of the exposure window by an angle equal to approximately ⅓ the angle between successive exposure areas.

FIG. 3 shows the camera's rear loading door 22, which is hinged to the camera body at 70 and held in its closed position by a latch 72 and 73 that is releasable by means of lever 20. When the loading door is open, as shown in FIG. 3, the film cartridge 24 is insertable into cartridge chamber 74, in which the front wall 34 of the cartridge lies adjacent the rear surface of an intermediate camera wall 76, located rearwardly of the major components of the camera mechanism to which the present invention is directed. When the cartridge is loaded into the chamber 74, a film support frame member 82, aligned with the camera lens, is received in the exposure window 32 of the cartridge. A driving camera hub member 84 engages the hub 27 of the film disk, and the slide operating pin 37 engages the cover slide. Closing the cover door causes spring members 85 thereon to seat the cartridge against the intermediate wall member and brings a pressure applying member 90, supported by spring arm 92, into alignment with the cartridge pressure plate member 44. Latching of the door causes slide operating pin 37 to move the cover slide out of alignment with the exposure window so that the exposure region of the film disk can be supported against frame member 82 by the pressure plate under the influence of the pressure applying member 90. When the cover slide is open, a metering pawl tooth 98 extends through the exposure window to engage the metering notch 30 in the periphery of the film disk when each exposure region 28 is properly aligned with the lens to control the incremental rotation of the disk. After the film disk has been exposed, the process by which the cover door is unlatched first withdraws the metering pawl tooth from the exposure window and moves the cover slide to close the exposure window. This occurs before the door can be opened, thereby preventing accidental light damage to the exposed film. As the cartridge is removed, the unlocking pin 47 withdraws from the cartridge opening 48, thus allowing the locking device to again lock the cover slide in its closed position. The foregoing is functionally similar to the mechanism used in commercial cameras.

Figure 5:
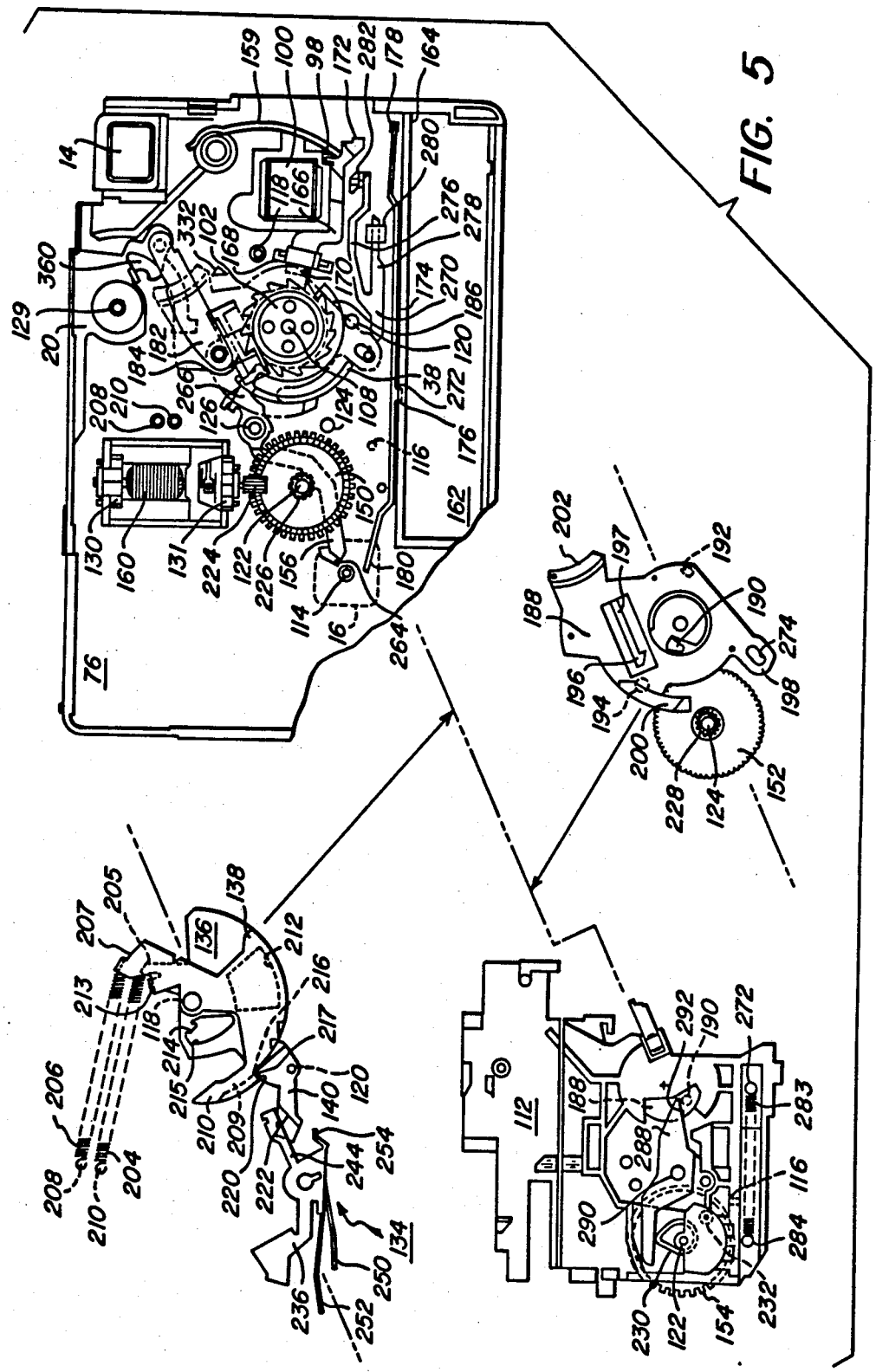
FIG. 5 is a front "exploded" view of the mechanism of the camera shown in FIG. 1.

Referring now to the front view of the mechanism in FIG. 5, the front surface of the intermediate camera wall 76 provides the main mounting member for the camera mechanism components. The lens assembly 100 and the film support frame member 82 (FIG. 3) are constructed so as to assure the requisite film-to-lens location and are mounted through an opening in the intermediate camera wall 76.

The camera hub or film drive member 84 (FIG. 3) extends through an opening in the intermediate camera wall 76 and is an integral part of and coaxial with a drive ratchet gear 102 on the forward side of the wall. An axial shaft 108 extends forwardly of the ratchet gear 102, and is rotatably located in a recess, not shown, in a mechanism plate 112 overlying the intermediate wall 76 and the components thereon. The ratchet gear is provided with the same number of teeth as there are image areas on the film disk, 15 in the case of the presently commercially available film.

The front surface of the intermediate wall 76 is provided with a locating post 114 for the shutter button 16, a post 118 for shutter blades 136 and 138, a post 120 for a shutter latch 140, posts 122 and 124 for gears 150, 152 and 154, post 126 for a blocking lever 156, post 128 for a charger actuator lever 158 (see FIG. 11), post 129 for the door latch lever 20, a guide rail 159 on which the shutter blades ride during actuation, and motor mounting cradles 130, 131 for a motor 160, as will be further described hereinbelow. Additional mounting members and support ribs may also be provided on the front surface of the intermediate wall, for example to locate and connect the camera's circuitry located thereon, as illustrated in FIG. 14. Further locating means may be provided on both the front and rear surfaces of the mechanism plate 112 such as a post 116 for a release lever 134, and shutter stop 332, as appears hereinbelow. A battery compartment 162, separated from the mechanism chamber by a battery compartment wall 164, is provided along the lower portion of the intermediate wall 76. Suitable terminals, shown in FIG. 14, connect with the batteries 164 therein to provide operating current to the camera system.

A first film locating means, comprising the metering pawl tooth 98, is carried at one end of a sickle-shaped metering pawl 166 which is pivotally supported by an axle 168 so that the tooth can be moved perpendicular to the intermediate wall 76. The pawl 166 and the pawl tooth 98, are spring-loaded on the film engaging position by a spring, not shown. The pawl 166 is also provided with a foot portion 170 adjacent the ratchet gear 102 and a lifting cam 172 adjacent the pawl tooth 98.

A second film locating means, comprising a platen actuator lever 174, is disposed along and pivotally supported in the battery compartment wall 164 by a centrally disposed pivot 176. One end of the platen acutator lever 174 is provided with a pin 178 which extends through wall 76 to engage the pressure applying member 90 on the camera door and applies force to the cartridge pressure plate member 44 at the appropriate time in the exposure cycle. The opposite end 180 of the platen actuator lever is arranged to engage and be actuated by the shutter button 16.

The camera loading door latch is a portion of the door latch lever 20 which is supported by locating post 129. The door release lever 20 is operatively connected by a link 182 to a dark slide lever 184. The dark slide lever includes the slide operating pin 37 which extends through and is movable in slot 38 in the intermediate wall 76. The dark slide lever encircles the hub member 84, between the ratchet gear 102 and the intermediate wall 76, and is arranged to move the dark slide operating pin 37 counterclockwise to close the cartridge dark slide as the door release lever 20 is rotated clockwise to release the camera loading door latch 72. The dark slide lever 184 is also provided with a cam surface 186 arranged to engage and depress the foot portion 170 of the metering pawl 166, thereby retracting the metering pawl tooth 98 from a metering notch 30 in the film disc to permit closure of the cartridge dark slide.

A driver member 188 is mounted on the shaft 108 of the ratchet gear and is arranged for reciprocating pivotal motion in opposite first and second directions. The drive member is provided with a drive boss 190 on the upper surface, and a shutter recocking lug 192 and a blocking lever boss 194 on the lower surface. A film advancing means such as film advance pawl 196 depends from the lower surface of the driver member into engagement with the ratchet gear 102. The shaft of the film advance pawl 196 may be formed integrally of the driver member and has sufficient flexibility to ratchet over the teeth of the ratchet gear during counterclockwise movement of the driver member and to engage the ratchet gear and to advance it during clockwise motion of the driver member. The driver member is also provided with a demetering arm 198, a release lever reset arm 200, and a door lever arm 202, all of which will be described more thoroughly hereinbelow.

The shutter (see FIGS. 5, 7 and 8), comprising shutter blade 136 and capping blade 138 are mounted on post 118 for rotation thereabout, supported and guided by shutter rail 159. The shutter and capping blades are generally semicircular and are provided at one side with radial arms 205 and 207, respectively, and on the opposite side with trailing arms 209 and 210 which cooperate with the shutter latch 140. Each of the blades are spring loaded in the counterclockwise direction by shutter springs, 204 and 206, extending between the radial arms of the respective blades and posts 208 and 210. The shutter blade is also provided with an exposure aperture 212 and a capping blade engaging tab 213 which provides a stop for the capping blade during exposure and also engages the capping blade 138 during the recocking operation. The shutter blade is also provided with a cocking tab 214 adjacent a cocking lug relief opening 215. The cocking tab is engageable by the shutter recocking lug 192 on the bottom of driver member 188 during the recocking of the shutter. The cocking lug relief opening 215 in the shutter blade provides for relative movement of the cocking lug on the driver member 188 after the shutter has been recocked and during the return movement of the driver member to its initial position. The shutter blade and the capping blade are each provided with a shutter latch engaging surface 216 and 217 which are engaged by the shutter latch 140.

The shutter latch member 140 is rotably mounted on post 120 and is spring loaded in the clockwise direction by a spring, not shown. The shutter latch includes a shutter blade engaging lip 220 and a release lever engaging lip 222. The two lips of the shutter latch are so arranged that clockwise motion of the release lever will move the shutter latch counterclockwise against the force of its spring to release the shutter latch surface 216, permitting the shutter blade to commence the exposure cycle. It will be noted that the latch engaging surface of the shutter blade is shorter than that of the capping blade so that it may be released without releasing the capping blade. The trailing arm of the shutter blade is also provided with a ramp surface 218 which, during its movement in the exposure cycle, engages the shutter latch 140 at the point that the exposure aperture fully uncovers the lens and causes the shutter latch to rotate further counterclockwise to release the capping blade which then moves to cover the aperture and terminate the exposure.

The motor 160, mounted in cradles 130 and 131 formed on the intermediate wall 76, is provided with a drive pinion 224 which engages the crown gear 150. The pinion 226 of the crown gear engages idler gear 152, the pinion 228 of which engages cam gear 154. The cam gear carries on its upper surface cam 230, and on the lower surface a release lever boss 232.

The release lever 134 (see FIG. 11) is rotably mounted on locating post 116 on the back of the mechanism plate and is a multi-function element which serves as the operating control for the entire camera operation sequence. The release lever includes a hub 234 from which a multiplicity of arms extend: a shutter button-engaging arm 236 which is provided wtih a shutter button-engaging tab 238, a cam gear boss-engaging flange 240, and a cam gear boss-engaging surface 242; a shutter latch-engaging arm 244 which is provided with a shutter latch engaging claw 246 and a reset surface 248; a power contact and spring arm 250 which is provided along the lower surface of the release lever and which provides a spring force to urge the release lever in a clockwise direction about post 116; a charger-run switch arm 252 and a motor shorting switch arm 254 also extend outward in the opposite directions from the lower portion of the release lever hub 234. The release lever is preferably formed of sheet metal or other flexible, electrically conductive material since all of the arms must flex, arms 236 and 244 flexing in a plane parallel to the axis of post 116 and arms 250, 252 and 254 flexing in a plane perpendicular to the axis of post 116. Further, arms 250, 252 and 254 form an integral part of the electrical circuit of the camera and perform various switching functions at appropriate times in the operation thereof. All of these functions are more fully described in the operation portion of this disclosure.

Figure 6:
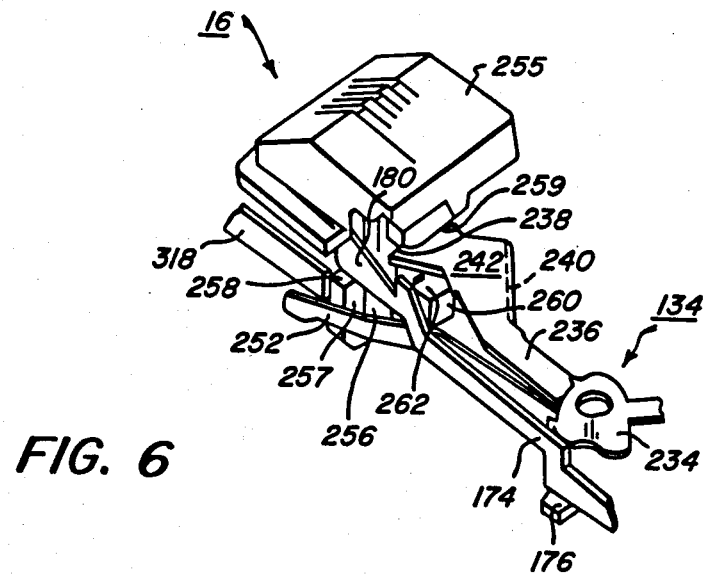
FIG. 6 is an enlarged perspective detail of the shutter button and related components.

The shutter button 16 (see FIG. 6) comprises a button pad 255 which the camera operator engages with his finger to actuate the camera. Extending behind the button pad is a central tubular portion 256 which engages and is guided by locating post 114 extending from the intermediate wall 76 of the camera. The tubular portion entraps a return spring, not shown, between the inner end of the tubular portion and the end of the locating post. A rib 257 extends outwardly from the central tubular portion along the lower side thereof and is arranged to intercept the arm 252 of the release lever 134 when the shutter button is depressed. A slot 258 is provided at the upper end of rib 257 which entraps and moves the end 180 of the platen actuator lever 174. A second rib 260 is provided along the central tubular portion 256 located 90° away from rib 257. Rib 260 is provided with a slot 262 which entraps and moves arm 236 of the release lever when the shutter button is depressed. The lower end of rib 260 is arranged to engage blocking lever 156 during operation of the motor to prevent depression of the shutter button during that portion of the cycle and thus to prevent the possibility of double exposure.

The blocking lever 156 (see FIG. 5) is pivotally mounted on locating post 126 and is provided with a first, shutter button-engaging and 264 and a second blocking lever boss-engaging and 266 which is arranged to cooperate with the boss 194 on the undersurface of the driver member 188. The blocking member is spring-biased in a clockwise direction to urge end 264 into position to block the shutter button 132 by residing under the end of rib 260 except when the opposite end 266 is contacted by the driver member boss 194. The boss 194 urges the blocking lever in a counterclockwise direction against the force of the spring when the driver member is in the initial, at-rest position.

A demetering lever 270 comprises a first driving end having an upwardly extending pin 272 which extends through a slot 274 in the driver member demetering arm 198. The opposite end of demetering lever 270 is fiburcated into a cam leg 276 and a guide leg 278. The guide leg 278 extends in sliding engagement through a locating clip 280 on the intermediate wall 76 to assure the linear motion of the detmetering lever during operation of the driver member. The cam leg 276 is flexible to permit lateral motion thereof and is provided at its end with a cam member 282. Referring to FIGS. 9 and 10, the cam member is provided with a pair of cam surfaces that cooperate with the lifting cam 172 on the metering pawl 166. The first cam surface 350 engages the side wall 351 of the lifting cam 172 and is arranged to deflect the cam member 282 around the lifting cam during initial movement of the demetering lever, to the right in FIG. 5. After the cam member 282 of the demetering lever has passed to the right of the lifting cam 172, the flexible nature of the cam leg causes the cam member to snap into alignment with the lifting cam 172. The second cam surface 352 of cam member 282 is arranged, as the demetering lever 270 is moved to the left, to slide under the lifting cam 172 and to lift it over cam member 282 and, in the process remove the pawl tooth 98 attached to the metering pawl 166 from engagement with the metering notch in the periphery of the film disk preparatory to the film disk being advanced by the film drive hub.

The upper end of pin 272 of the demetering lever 270 extends through the slot 274 in the driver member demetering arm 198 and provides an attachment post for a driver member spring 283 which extends from pin 272 to an attaching post 284 on the upper surface of the mechanism plate 112. The driver member spring 283, in addition to providing a force to the end of the demetering lever also provides a force to the driver member, urging it in the clockwise direction. Accordingly, the driver member spring 283 provides the driving force to the driver member for advancing the film disk during the film advance portion of the camera cycle. Moreover, the spring 283 provides a compliant connection between the driver member and the motor and gear train that permits the camera motor to complete its cycle even though the film disk is unable to advance a full frame, as would occur after the exposure of the last frame of the film disk.

A lever means is arranged to transmit motion between the cam 230 on the cam gear 154 and the driver member 188 and comprises a drive link 288 which is pivotally mounted on a pin 290 on the upper surface of the mechanism plate 112. The drive link is actually a cam follower and is arranged to be driven by cam 230 on the cam gear 154 during operation of the motor. End 292 of the drive link, opposite to the end engaging the cam, engages the drive boss 190 on the driver member 188 to transfer unidirectional rotation of the cam gear 154 into bidirectional motion of the driver member. However, since cam 230 is only a single surface cam, power is only transferred to the driver member during its motion in the first, counterclockwise direction. The movement of the driver member in the second clockwise direction is powered by spring 283 which is energized during the counterclockwise motion of the driver member. The spring then releases its energy to drive the driver member during movement in the second, clockwise direction. During this movement of the driver member to the initial, at rest position, the cam, gear train and motor are not in driving engagement with the driver member but provide a governing action to the movement of the driver member under the force of spring 283 to prevent instant return of the driver member to its initial position and the attendant high forces that would result on the camera components connected thereto.

An electric schematic of the electric system of the camera is illustrated in FIG. 13 and illustrates the connection of the batteries, motor and flash charging circuit, with the flash charging circuit being of a type well known in the art. The arrangement of the contacts and leads associated with the circuit as embodied in the camera are illustrated in FIG. 14. As illustrated, the positive terminal of the batteries 165 is connected via terminal 301 to circuit element 302 to one terminal 304 of the motor 160. This leg of the circuit is also provided with a contact 306 which is arranged to connect with motor shorting switch arm 254 of the release lever 134. The opposite terminal 308 of the motor connects to circuit member 310 which terminates in terminal 312 which is arranged to engage the power contact-spring arm 250 of the release lever. A negative battery contact 314 is connected to a negative terminal 316 of the charger circuit 317 and to a contact 318 which is engageable with the charger-run switch arm 252 of the release lever. A charger contact member having a terminal 320 contacting with the positive side of the charger circuit terminates in a contact 322 which is also engageable with the charger-run switch arm 252 of the release lever. As illustrated, with the camera in the "at rest" condition ready for actuation to expose a picture, the release lever forms a complete circuit between the positive battery terminal 301 and the positive terminal of the charger circuit 320 through the terminal 306 release lever arm 254, and release lever arm 252 which contacts the terminal 322 connected with the positive charger circuit terminal 320. At the same time the contact 312 on the negative side of the motor is contacted by the arm 252. Thus the motor is shorted out, assuring no operation of the motor under these conditions and the charger circuit is activated, charging the flash circuit preparatory for actuation.

A charger actuator lever 158 pivotally mounted on post 128 beneath the battery compartment extends from the camera door hinge at the end nearest the flash circuit to the terminal 322 connected to the positive terminal of the charger circuit. The camera door hinge is provided with a tab which engages the end of the charger actuator lever when the door is in the closed position to move the charger actuator lever clockwise whereby the end thereof in contact with terminal 322 moves it out of engagement with the charger-run arm 252, thus disconnecting the charger circuit from the battery during times that the camera door if closed, thereby saving the battery power.

OPERATION OF THE CAMERA

In the operation of the loaded camera of the present invention (a description of the loading and unloading operation is presented hereinbelow), the user opens the cover handle, uncovering the lens and the shutter button. When the cover handle is rotated about the hinges at each end of the battery compartment, the tab on the hinge adjacent the flash permits the charger actuator lever 158 to rotate counterclockwise, moving the contact 322 into engagement with arm 252 of the release lever, energizing the flash charging circuit. As illustrated in the schematic, a "ready" light 360 is provided which indicates to the user when the flash circuit is sufficiently charged to permit taking a satisfactory flash exposure.

When the user is ready to take a picutre the shutter button 16 is depressed. As the button is depressed, the end 180 of the platen actuator lever which is retained in slot 258 of the shutter button rib 257 is also depressed, pivoting the actuator lever about the pivot 176 and lifting the platen actuator pin 178 at the opposite end, relieving pressure from the pressure applying member 90 in the camera loading door 22. This frees the pressure applying member to apply pressure to the pressure plate member 44 in the film cartridge, pressing the film against the film support frame member 82 and accurately locating the film in the exposure plane for optimum focus resolution. Simultaneously, the upper edge of the shutter button rib 260 engages the tab 238 of arm 236 of the release lever 134, forcing it down until the surface 242 clears the lower end of boss 232 on the lower surface of the cam gear 154. As soon as the surface 242 has cleared the lower end of boss 232 the release lever is rotated clockwise about post 116 because of the spring force stored in arm 250. As soon as release lever rotates, the charger-run switch arm 252 is moved out of contact with the positive terminal 322 for the charger circuit, deactivating the charger circuit. The rotation imparted to the release lever by the spring arm 250 is sufficient to move the charger-run arm 252 into contact with the negative battery terminal 318, but for the fact that the shutter button rib 257 intercepts arm 252 before that contact can be made and prevents the contact from occurring until the shutter button is released. In this way the operation of the motor is prevented until the exposure is made by the shutter of the camera. Similarly, as the release lever rotates clockwise, the motor shorting arm 254 is disconnected from terminal 306. Also, as the release lever rotates clockwise, the shutter latch engaging claw 246 on arm 244 engages the lip 22 of the shutter latch 140 rotating it counterclockwise so that the shutter blade engaging lip 220 releases the shutter latch surface 216 permitting the shutter blade 136 to be rotated counterclockwise under the influence of shutter spring 204. The shutter latch arm 244 at this point hits a stop 318 (see FIGS. 7a-c) on the backside of the mechanism plate 112 to prevent the release lever from rotating further and inadvertently releasing the capping blade. After the shutter blade 136 has rotated approximately 36°, the ramp 218 (see FIG. 8) on the trailing arm thereof contacts the lip 220 of the shutter latch 140 and, as the shutter blade moves further, the shutter latch is moved sufficiently to release the latch surface 217 of the capping blade 138. At this point the aperture 212 in the shutter blade 136 has uncovered the exposure aperture and permits exposure of the film through the lens. At the same time the radial arm 205 of the shutter blade contacts a flash synchronizing contact (not shown) which completes the flash circuit, firing the flsh to illuminate the exposure. The capping blade has then been released by the latch member and covers the exposure aperture, completing the exposure. The shutter blade comes to rest against a shutter stop 332 on the back of the mechanism plate and the capping blade is trapped by the capping blade cocking tab 213 on the shutter blade. At this point the shutter exposure sequence is complete, but no further camera operation will occur until the user releases the shutter button.

When the camera user releases the shutter button, the button is returned to its initial position by the shutter button spring, permitting the charger-run switch leg 252 of the release lever to move into contact with the terminal 318 of the negative battery contact 314, energizing the motor 160. The motor drives the crown gear 150, the idler gear 152 and the cam gear 154. In the particular example illustrated the gear reduction is 181.3 to 1. The cam 230 on the cam gear rotates the drive link 288 about the pin 290 and, by engagement of end 292 of the drive link with the drive boss 190 on the driver member 188, causes the driver member to rotate in a first, counterclockwise direction. As the driver member rotates in the counterclockwise direction, the shutter blades are relatched and the advance lever prepares for film advance. Specifically as the driver member 188 rotates counterclockwise it releases the blocking lever to block the release button, it cocks and latches the shutter blades, the film advance pawl is advanced over a tooth on the drive hub, the demetering lever cam is advanced around the lifting cam of the metering pawl and energy is stored in the driver member spring.

In particular, as the driver member begins its movement in the first direction, the blocking lever boss 194 moves away from the end 266 of the blocking lever 156, allowing the blocking lever to rotate under the influence of its spring in clockwise direction whereby the end 264 rotates under the rib 260 of the shutter button to prevent the shutter button from being redepressed during the film advance cycle. As the driver member is further rotated in the first direction, the shutter recocking lug 192 engages the shutter blade cocking tab 214 and moves the shutter blade in a clockwise direction towards the cocked position. The capping blade, in engagement with the tab 213 on the shutter blade is also recocked at the same time. As the driver member reaches the furthest extent of the motion in the first direction, the release lever reset arm 200 lifts the latch engaging arm 244 of the release lever off of the shutter latch 140, permitting the shutter latch to engage the shutter and capping blade latch engaging surfaces 216 and 217 as the shutter blades rotate clockwise. By this time the film advance pawl 196 of the driver member has snapped over the next tooth of the ratchet gear 102.

Simultaneously, the driver member advances the demetering lever 270 to the right, around the metering pawl cam 172 in position for lifting the metering pawl when the driver member begin its movement in the second direction. The motion of the driver member also extends the driver member spring 283, storing energy to be used for demetering and film advance.

When the motor has driven the cam gear to the point that the drive link is at the apex of the cam lobe, the driver member is dwelling at a position 37° counterclockwise from its initial, at rest, position. This condition is illustrated in FIG. 12. At this point the driver member spring 283 is fully extended, the cam on the demetering lever has snapped around the metering pawl lifting cam, the film advance pawl is engaged with the next tooth on the ratchet gear of the drive hub, the blocking lever is under the shutter button, the shutter blades have been relatched, and the release lever is being held out of engagement with the shutter latch.

This condition is transient only and has been described here for illustrative purposes only. The motor does not stop at this point but continues to run driving the gear train and the cam on the cam gear. As the apex of the cam lobe passes (in a clockwise direction) the drive link the cam will not further drive the driver member but will act with the gear train and motor as a governor, as the driver member is driven in the second direction back to its initial, at rest, position by the energy stored in the driver member spring 283.

As the spring pulls the driver member in the second, clockwise direction, the demetering lever cam 282 is pulled under the metering pawl lifting cam 172 to lift the metering pawl tooth 98 from the metering notch in the periphery of the film disk. As the metering pawl tooth is cleared from the film notch, the film advance pawl 196 on the driver member 188 starts to turn the hub member 84 and the film disk. Soon after the film disk has begun turning the demetering lever cam 282 is pulled from under the metering pawl lifting cam 172, letting the metering pawl tooth 98 down onto the surface of the turning film disk. As the driver member approaches the intial, at rest position, the boss 194 on the lower surface thereof engages the end 266 of the blocking lever 156 and moves the blocking lever counterclockwise removing the opposite end 264 from beneath the shutter button 16. At this point the film disk has advanced to the next frame and the metering pawl tooth drops in the next metering notch at the edge of the next film frame, arresting the movement of the film disk, the hub 84, and the driver member 188 with the tension of the driver member spring 283 maintaining tension on the driver member to hold the edge of the notch against the metering pawl tooth 98 until the next camera operation cycle is commenced.

The release lever reset arm 200 of the driver member 188 is also removed from beneath the shutter latch engaging arm 244 of the release member 134 returning to a position where it can be reset.

As the driver member is returned to its initial position, the motor continues to run, driving the cam gear until the boss 232 on the lower surface thereof engages the flange 240 on arm 236 of the release lever. Continued rotation of the cam gear resets the release lever. First the charger-run switch leg is pulled away from negative battery terminal 318, shutting off the motor. However, the motor and gears continue to coast until the charger-run switch arm touches the charging circuit terminal 322. This allows current to continue passing through the motor, allowing it to run until the motor shorting switch arm 254 contacts terminal 306 shorting the motor and stopping it almost immediately. At the same time, the shutter latch engaging arm 244 has been returned to its intial position ready for the next actuation of the shutter button to release the release lever to unlatch the shutter. The boss-engaging flange 240 of the shutter botton-engaging arm 236 of the release lever is abutting the cam gear boss 232 and the spring arm 250 is flexed ready to drive the release lever 134 upon actuation of the shutter button.

At this point the motor is shorted and stopped, the charger circuit is charging and the camera is ready for the next exposure. The charger circuit will continue to charge until the cover handle is closed, pulling the charger terminal 322 away from the charger-run switch arm 252.

After exposing the fifteenth, and final, film frame of a cartridge, the film advance mechanism commences to advance the film disk but is stopped in mid-stroke. The return of the driver member 188 in the clockwise direction is prevented by the blocking of further rotation of the disk by engagement of the hub ear with the upper edge of the cartridge ear, as described above. The shutter button is locked because the blocking lever has not been moved from beneath it. The motor and gear train may continue to run until the cycle is terminated by the boss on the cam gear recocking the release lever, turning off the motor. This occurs because the cam lobe is allowed to come away from the drive link which has not finished its motion because of the blockage of the driver member.

UNLOADING AND LOADING

The camera user then opens the camera to remove the exposed film cartridge and replace it with a fresh, unexposed film cartridge. As the door release lever 20 is rotated clockwise, the following operations occur simultaneously: The dark slide link 182 rotates the dark slide lever 184 counterclockwise; pin 360 on the door release lever engages the arm 202 on the driver member to hold it in the position it was stopped at by the fully exposed cartridge lockup, and cam surface 186 of the dark slide engages the foot 170 of the metering pawl. As the dark slide lever 184 is rotated counterclockwise, the dark slide operating pin 37 closes the dark slide of the cartridge; at the same time the cam surface 186 depresses the foot 170 of the metering pawl 166, to retract the metering tooth 98 from the metering notch of the film disk, clearing the way for the closure of the dark slide. This all occurs before the loading door latch 72 is actuated to release the rear loading door 22. The exposed cartridge may then be removed and a fresh cartridge inserted.

After insertion of a new film cartridge into the camera, the rear door is closed, and engaged by the latch 72, permitting the door release lever 20 to rotate counterclockwise. As this occurs, the dark slide lever 184 is rotated clockwise, opening the dark slide of the new film cartridge, and disengaging the metering pawl 166 which drops the metering tooth 98 onto the surface of the film disk. At the same time, the pin 360 on the door latch 20 is removed from the arm 202 of the driver member permitting the driver member spring 283 to rotate the driver member 188 clockwise to its initial, at rest position. This movememt of the driver member moves the ratchet gear 102 and the hub to move the first frame of the new film disk into position for exposure. At this point the metering pawl tooth engages the metering notch for that frame of film. The camera mechanism has thus been returned to the initial "at-rest" position, ready for exposure of the first frame of the film.

While the foregoing unloading and loading operation has been described with respect to fully exposed and completely unexposed film cartridges, the same operations occur with partially exposed cartridges without risk of loss of a previously exposed frame or the mechanical jamming of the camera.

ALTERNATIVE EMBODIMENTS

While the present invention has been described with respect to a preferred embodiment, it will be appreciated that variations in portions of the structure may be employed without departing from the concept of the invention. For example, referring to FIG. 15, it will be seen that the driver member spring 283 which forms the compliant member between the motor drive and the driver member, and in the preferred example is an extension spring, may be replaced by a compression spring 480. In this embodiment, the drive link 488 is provided with a double acting cam follower 490 at one end of the link. At the opposite end of the drive link, beyond the pivot point 492, the drive link engages an arcuate slot 294 in the driver member 496. In this embodiment, the drive link positively engages one end of the slot during motion of the driver member in the counterclockwise direction, but when the drive link reverses direction to reverse the direction of movement of the driver member it bears upon the compression spring to drive the driver member in the clockwise direction. Thus when the film drive is locked up and the driver member stops movement in the clockwise direction the spring is compressed by the drive link without moving the driver member and without interfering with completion of the cycle of the motor 498, gear train 500 and cam 502.

Accordingly, the present invention provides a simple, compact and inexpensive camera and yet provides one button operation to expose the film. The actuating motor which then advances the film. The compliant member is arranged to resiliently connect the driver member to the motor and gear train whereby the simple effective operation of the camera and the film advance is facilitated.

The invention has been described with reference to specific embodiments and variations, but it should be apparent that other modifications and variations can be made within the spirit and scope of the invention, which is defined by the following claims.

We claim:

1. In a disk camera having a cockable and releasable shutter means, film advancing means, film locating means movable between a film engaging position and a film releasing position, and a driver member arranged for movement in opposite first and second directions and arranged to move said film locating means to said film releasing position, to cock said shutter means, to advance said film, and to move said film locating means into said film engaging position, the improvement comprising:

motor means;

means for applying force generated by said motor means to said driver member to move said driver member in one of said directions; and compliant means coupled to said driver member operable to move said driver member in the other of said directions to advance said film.

2. The invention according to claim 1 wherein said force applying means includes a cam and lever means coupling said motor means to said driver member.

3. The invention according to claim 2 wherein said driver member is resiliently urged against said lever means by said compliant means.

4. The invention according to claim 3 wherein said lever drives against said driver member when said driver member is moved in said one direction and against said compliant means when said driver member is moved in said other direction.

5. The invention according to claim 1 wherein said driver member is resiliently urged against said force applying means by said compliant means.

6. The invention according to claim 1 including a shutter actuating means having an actuating stroke and a return stroke, said actuating means arranged to release the shutter means on the actuating stroke and to initiate the operation of said motor means on the return stroke.

7. The invention according to claim 6 wherein said actuating means moves a film locating means into engagement with said film on said actuating stroke and releases said locating means on said return stroke.

8. In a disk camera having a cockable and releasable shutter means, film advancing means, film locating means movable between a film engaging position and a film releasing position, a driver member arranged for movement in opposite first and second directions after actuation of said shutter means, said driver member arranged to move said film locating means to said film releasing position, to cock said shutter means, to advance said film and to move said film locating means into said film engaging position, the improvement comprising:

motor means operable to move said driver member in said first and second directions;

means coupling said motor means to said driver member including a lever means engaged by said motor means and a compliant member which resiliently urges the driver member against the lever means and provides compliance between said motor means and said driver member when said driver member advances said film.

9. The invention according to claim 8 wherein said driver member is provided with lever engaging means, said lever means driving against said lever engaging means when said driver member is moved in said first direction.

10. The invention according to claim 9 wherein said lever means drives against said compliant member when said driver member is moved in said second direction.

11. The invention according to claim 8 wherein means is provided for inactivating said motor means upon completion of movement of the driver member in said second direction.

12. The invention according to claim 8 including a shutter actuating means having an actuating stroke and a return stroke, said actuating means arranged to release the shutter means on the actuating stroke and to initiate the operation of said motor means on the return stroke.

13. The invention according to claim 12 wherein means is provided for inactivating said motor means upon completion of movement of the driver member in said second direction.

14. The invention according to claim 13 including interlock means arranged to inactivate said shutter actuating means during the operation of said motor means.

15. The invention according to claim 12 including second film locating means, said shutter actuating means arranged to move said second film locating means into a film engaging position during said actuating stroke and to move said second film locating means into a film releasing position on the return stroke.

16. In a disk camera having a cockable and releasable shutter means, film advancing means, film locating means movable between a film locating position and a film releasing position, a driver member arranged for movement in opposite first and second directions after actuation of said shutter means, said driver member arranged to move said film locating means to said film releasing position, to cock said shutter means, to advance said film and to move said film locating means into said film locating position, the improvement comprising:

motor means operable to move said driver member in said first and second directions, said driver member having an arcuate slot therein;

a cam driven by said motor means and a cam-driven lever which engages said slot in said driver member; and a compliant member arranged to resiliently urge said lever and one end of said slot into engagement whereby said lever means drives against said one end of said slot when driver member is moved in said first direction and said compliant member allows said lever to move toward the other end of said slot when said driver member is moved in said second direction.

17. In a disk camera having a cockable and releasable shutter means, film advancing means, first and second film locating means each movable between a film engaging position and a film releasing position, a driver member arranged for movement in opposite first and second directions;

motor means;

means coupling said motor means to said driver member including a cam member coupled to said motor and a lever means arranged for transmitting motion between said cam member and said driver member;

a compliant member arranged to resiliently hold said driver member into engagement with said lever means whereby said motor means moves said driver member in said first direction and said compliant means moves said driver member in said second direction;

a shutter actuating means having an actuating stroke and a return stroke, said actuating means arranged to release said shutter means on the actuating stroke and to initiate the operation of the motor means on the return stroke, said actuating means arranged to move said second film locating means into a film engaging position on the actuating stroke and to move said second film locating means into a film releasing position on the return stroke;

said driver member having means for recocking said shutter means during movement of the driver member in said first direction;

said driver member having means for moving said first film locating means into a film releasing position during initial movement of the driver member in said second direction;

said film advancing means including a film-engaging hub provided with a ratchet gear; said driver member having a ratchet-engaging pawl arranged to advance said hub during movement of said driver member in said second direction after moving said first film locating means into said film releasing position, said driver member then arranged to move said first film locating means into a film engaging position after initiating the adavance of said hub;

a shutter actuating means interlock lever engaged by said driver member and arranged to inactivate said shutter actuating means during the operation of said motor means; and means for inactivating said motor means upon completion of movement of the driver member in said second direction.

* * * * *